United States Patent [19]

Bridges et al.

[11] Patent Number: 5,254,919
[45] Date of Patent: Oct. 19, 1993

[54] ENCODER SYSTEM USING LINEAR ARRAY SENSOR FOR HIGH RESOLUTION

[75] Inventors: Mark E. Bridges, Spencerport; Robert W. Easterly, Churchville, both of N.Y.

[73] Assignee: Eastman Kodak Company, Rochester, N.Y.

[21] Appl. No.: 673,710

[22] Filed: Mar. 22, 1991

[51] Int. Cl.$^5$ .................................. G05B 23/02
[52] U.S. Cl. .................................. 318/560; 318/602; 318/661; 318/603; 250/231.14; 250/231.16
[58] Field of Search .................................. 318/560–630, 318/661; 250/231 SE, 237 G, 231.14, 231.16, 201, 204, 231.18

[56] References Cited

U.S. PATENT DOCUMENTS

| | | |
|---|---|---|
| 3,824,587 | 7/1974 | Fowler . |
| 4,291,976 | 9/1981 | McMahon .......................... 250/231 |
| 4,465,373 | 8/1984 | Tamaki et al. ..................... 356/374 |
| 4,507,647 | 3/1985 | Minami et al. .................... 340/347 |
| 4,529,964 | 7/1985 | Minami et al. .................... 340/347 |
| 4,560,870 | 12/1985 | Ramamurti ....................... 250/237 |
| 4,572,952 | 2/1986 | March ............................... 250/231 |
| 4,577,101 | 3/1986 | Bremer et al. .................... 250/231 |
| 4,602,242 | 7/1986 | Kimura ............................. 340/347 |
| 4,687,928 | 8/1987 | Thurston .......................... 250/231 |
| 4,779,211 | 10/1988 | March ............................... 250/231 |
| 4,851,840 | 7/1989 | McAulay .......................... 341/137 |
| 4,953,933 | 9/1990 | Asmar .............................. 250/231.18 |
| 5,013,988 | 5/1991 | Sakano ............................. 318/602 |
| 5,073,710 | 12/1991 | Takagi et al. .................... 250/231.14 |
| 5,129,725 | 7/1992 | Ishizuka et al. ................. 250/231.14 |

Primary Examiner—Paul Ip
Attorney, Agent, or Firm—Hodgson, Russ, Andrews, Woods & Goodyear

[57] ABSTRACT

An encoder system and method wherein an encoder element driven by a motor has a series of segments arranged along a path with adjacent segments having different properties meeting at an edge or transition, two adjacent segments of different properties comprising a cycle and the encoder element having a number of cycles equally spaced along the path and defining a relatively coarse pitch relationship. A coupling medium, preferably optical, images the encoder segments onto a number of individual sensor elements of an array, such as a charge-coupled device sensor, wherein the sensor elements are spaced at a relatively fine pitch along the array. As the encoder element is moved by the motor, images of the edges or transitions are applied to the array sensor elements. After a sampling interval, signals from the array are digitized and shifted into a microprocessor which compares the present locations of the applied edges to the previous locations stored in the memory thereof and which calculates the present position and velocity output signals which can be used to control operation of the motor in a closed loop feedback control system. The encoder system achieves high resolution with a relatively coarse pitch and thus low cost encoder element. In addition, both position and velocity signals are derived from operation of the single encoder element.

19 Claims, 5 Drawing Sheets

ENCODER SYSTEM USING LINEAR ARRAY SENSOR FOR HIGH RESOLUTION

BACKGROUND OF THE INVENTION

This invention relates to the art of position and velocity sensing and control, and more particularly to a new and improved encoder system for achieving high resolution and low cost.

One area of use of the present invention is in closed loop feedback motor control systems although the principles of the present invention can be variously applied. When driving a load in a servo mechanism, precise control of motor output is achieved by employing closed loop feedback to regulate speed and shaft position to respond to torque perturbations in the system. Accurate control, particularly at very low rpm, requires the use of velocity and positional feedback.

Velocity information is usually provided by a tachometer attached to the motor. However, where 1% or better speed regulation is required relative to the motor tachometer and load, bearing and coupling anomalies, brush friction, and added inertia can become significant impediments to torque-starved low speed servo systems. In particular, such items can account for a large percentage of the motor's output torque. Such systems may also encounter signal to noise problems generated by commutator ripple, which is a ripple on the motor back emf which can cause cogging and velocity modulation.

Positional feedback is frequently provided by an incremental encoder attached to the motor, as in the case of a direct drive system, or to the output shaft in a system using some form of reduction between the motor and load. Encoders with quadrature output provide positional as well as directional information. While potentially not adding significantly to system inertia, encoders capable of positional accurance of less than 0.01% error in a low speed system require high pulse counts. Such encoders are expensive.

It would, therefore, be highly desirable to provide an encoder system and method for low speed operation which achieves high resolution and at the same time is economical.

SUMMARY OF THE INVENTION

It is, therefore, a primary object of this invention to provide a new and improved encoder system and method.

It is a further object of this invention to provide such an encoder system and method which achieves high resolution at low cost.

It is a further object of this invention to provide such a high resolution, low cost encoder system for use in low speed applications.

It is a further object of the present invention to provide such an encoder system and method which achieves close matching to system requirements in a convenient and economical manner.

It is a further object of the present invention to provide such an encoder system and method which is efficient in operation and economical to manufacture.

The present invention provides an encoder system and method wherein an encoder element driven by motive means has a series of segments arranged along a path with adjacent segments having different properties meeting at an edge or transition, two adjacent segments of different properties comprising a cycle and the encoder element having a number of cycles equally spaced along the path and defining a relatively coarse pitch relationship. A coupling medium, preferably optical, images the encoder segments onto a number of individual sensor elements in an array, such as a charge-coupled device sensor, wherein the sensor elements are spaced at a relatively fine pitch along the array. As the encoder element is moved by the motive means, images of the edges or transitions are applied to the array sensor elements. After a sampling interval, signals from the array are digitized and shifted into a microprocessor which compares the present locations of the applied edges to the previous locations stored in the memory thereof, and which calculates the present position and velocity of the encoder element to provide corresponding position and velocity output signals which can be used to control operation of the motive means in a closed loop feedback control system. Advantageously, the encoder system achieves high resolution with a relatively coarse pitch and thus low cost encoder element. In addition, both position and velocity signals are derived from operation of the single encoder element.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

Figure 1:
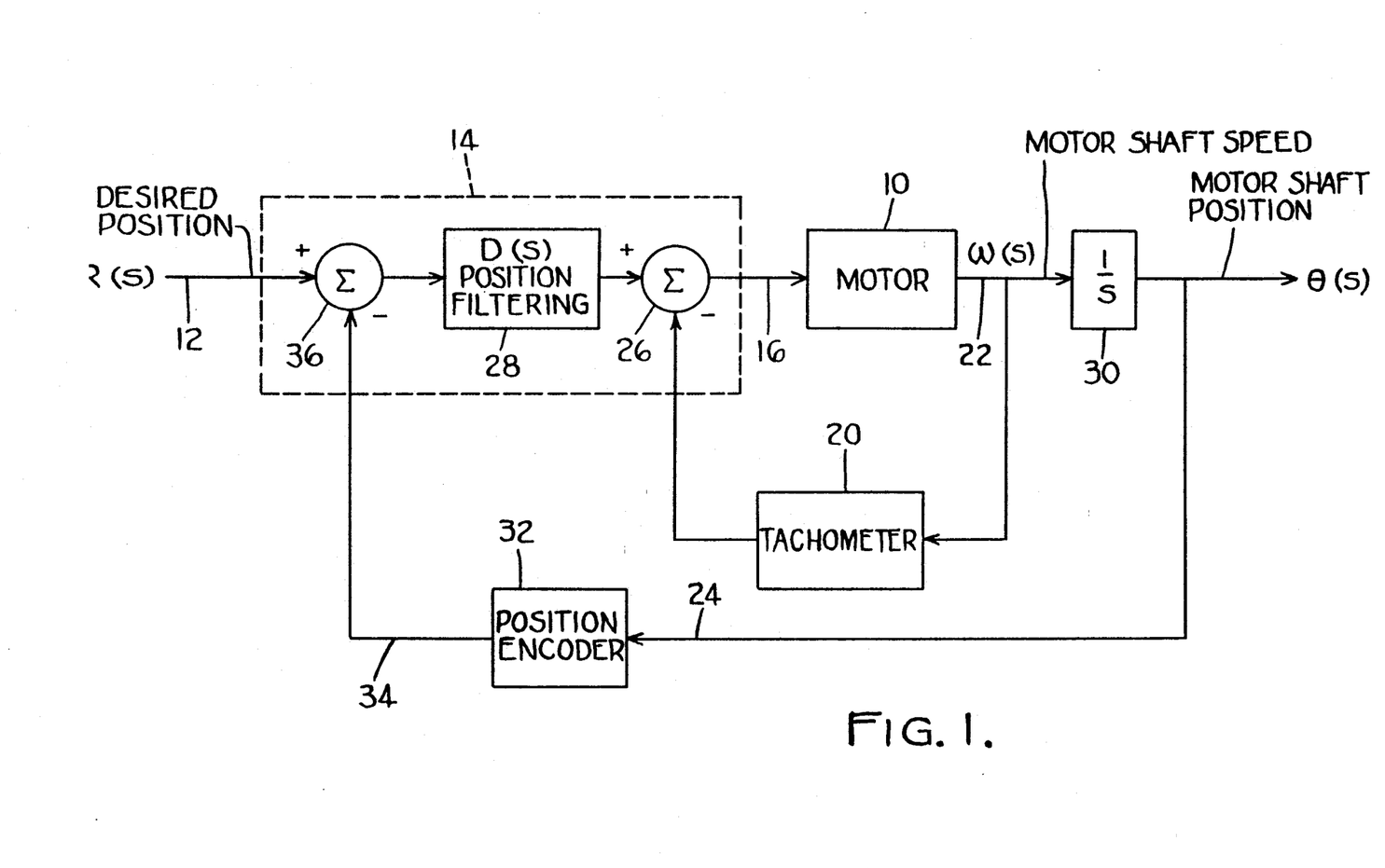
FIG. 1 is a schematic block diagram of a closed loop feedback control system to which the encoder system and method of the present invention is applicable.

FIG. 1 is a schematic block diagram of a closed loop feedback control system to which the encoder system and method of the present invention are applicable. In particular, the system of FIG. 1 is used when driving a load in a servo mechanism, and precise control of the output of motor 10 is achieved by employing closed loop feedback to regulate the motor speed and shaft position to respond to torque perturbations in the system. A signal 12 containing information as to the desired shaft position of motor 10 is applied to the input of a servo controller 14, the output 16 of which is a control signal which is applied to a control input of motor 10. Accurate control, particularly at very low r.p.m., requires the use of velocity and positional feedback. In particular, velocity information typically is provided by a tachometer 20 coupled to the motor output 22 which provides a velocity information signal at the output 24 thereof which is applied to one input of a summer 26 in servo controller 14. The other input of summer 26 is connected to the output of a position filter 28 of controller 14, and the output of summer 26 comprises the output of controller 14. Position information typically is provided by an encoder comprising the combination of an integrator 30 connected to the motor output 22 and a position encoder 32 connected to the output of integrator 30 and which provides a position information signal at the output 34 thereof which is applied to an input of a summer 36 in servo controller 14. The other input of summer 36 receives the position input signal 12, and the output of summer 36 is connected to the input of position filter 28. In the system of FIG. 1, while potentially not adding significantly to system inertia, encoders capable of high positional accuracy in a low speed system require a high pulse count, and such encoders are expensive.

Figure 2:
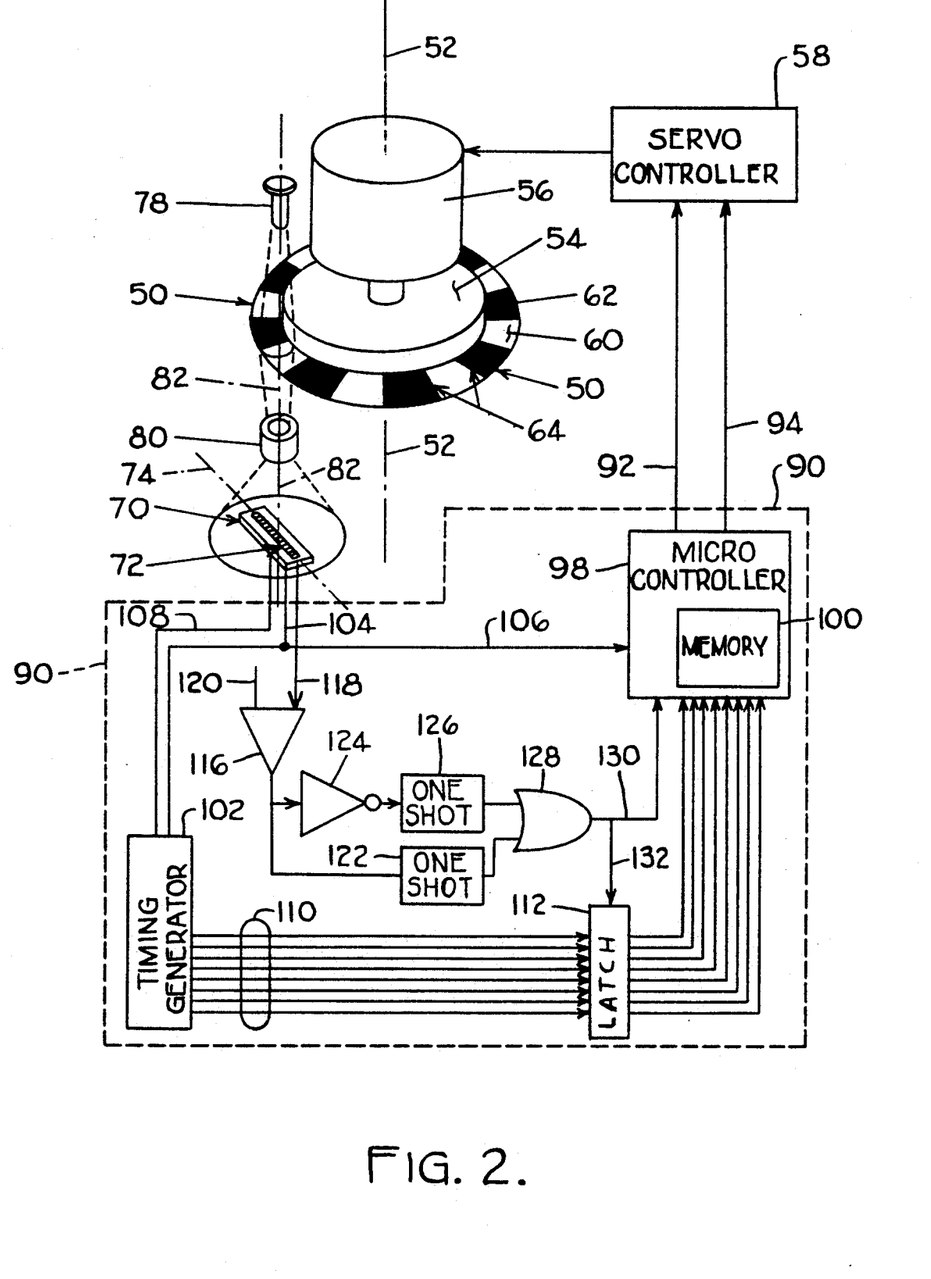
FIG. 2 is a schematic diagram illustrating the encoder system and method according to the present invention.

The encoder system and method of the present invention provides a new approach to velocity and positional feedback and is illustrated in FIG. 2. There is provided an encoder element 50 which in the system shown is in the form of a disc or wheel adapted to be rotated about an axis 52. Encoder 50 is attached to a load 54 which is driven by a motor 56 under control of a servo controller 58 in a manner similar to the combination of motor 10 and servo controller 14 in the system of FIG. 1. Encoder 50 includes a series of segments 60,62 arranged along a path with adjacent segments having two different properties and meeting at an edge or transition 64. In particular, in the system shown, the path extends around the circumference of encoder wheel 50, and segments 60 and 62 are defined by alternating transparent and opaque regions, respectively, of equal arcuate length and suitably formed such as being photographically exposed onto a film substrate or being etched or cut from a substrate. The edges or transitions 64 occur at the opaque/transparent boundaries as shown in FIG. 2. One transparent segment 60 and one opaque segment 62 comprise a cycle, and encoder 50 has a number of cycles, Nc, spaced equally about its periphery and thus about axis 52. The number of segments or cycles included in the circumferential path on encoder element 50 defines a relatively coarse pitch relationship as will be explained in further detail presently.

The encoder system according to the present invention further comprises an array 70 of sensor elements 72 in closely-spaced, fine pitch relation wherein each sensor element 72 has two states. In the system shown, array 70 is linear with the sensor elements 72 being spaced along the longitudinal axis 74 of array 70. Preferably, array 70 is a monochrome linear charge coupled device sensor including a number of photosensitive detector elements or pixels 72 spaced at a specific pixel pitch Sp when manufactured. Array 70 is located so as to be operatively coupled to encoder element 50 in a manner which will be described. A pixel is a digital sensor site.

The encoder system according to the present invention further comprises means for providing a coupling medium between encoder element 50 and array 70 which is responsive to the properties of encoder element 50 and which causes a change in the state of the array sensor elements 72 in response to movement of encoder element 50. The system of FIG. 2 includes optical means for optically coupling encoder element 50 and charge-coupled device 70 so that transitions or edges 64 on encoder 50 are imaged onto charge coupled device 70. In particular, there is provided a light source in the form of a high output light-emitting diode 78 for illuminating the side of transmissive encoder wheel 50 which faces away from array 70. A short focal length lens 80 is located at an appropriate distance between encoder wheel 50 and array 70 and along the optical path 82 of light directed through the encoder segments 60 onto array 70 for imaging the segments and edges at a predetermined magnification Mag onto a number Sn of the pixels 72 of array 70.

The encoder system according to the present invention further comprises processing means generally designated 90 connected to array 70 for converting information on the state of the sensor elements 72 including the number of sensor elements changed in state into first and second signals containing information on the position and velocity, respectively, of encoder element 50. The position and velocity signals are present on outputs 92 and 94, respectively, of processor means 90, which are applied to inputs of servo controller 58 for utilizing same. In particular, processing means 90 includes calculating means in the form of a micro controller 98 and a memory 100, and the remainder of processing means 90 shown in FIG. 2 includes conversion and timing means. The latter includes a timing generator 102 which produces a once per line rate clock signal on lines 104 and 106 connected to array 70 and to micro controller 98, respectively, clock signals on line 108 connected to array 70 for shifting out data on the sensor elements 72, and sensor element address signals on the plurality of lines designated 110 which are connected to a latch 112. The conversion and timing means also includes an analog-digital conversion circuit including a comparator 116, one input 118 of which is connected to the output of array 70 and the other input 120 of which is connected to a source of voltage (not shown) for establishing a threshold level. The output of comparator 116 is connected directly to a one shot 122 and through an inverter 124 to another one shot 126. The outputs of one shots 122,126 are connected to inputs of an OR gate 128, the output of which is connected by line 130 as an interrupting signal to micro controller 98 and by line 132 as a latching signal to latch 112.

The encoder system of FIG. 2 operates in the following manner. During operation of the encoder, the LED 78 is driven by a dc power source. As the encoder wheel 50 is made to rotate by the motor 56, images of the edges 64 passing through the field of view of the lens 80 are focused onto the pixels 72. After each sampling interval (Tint), the analog signals on line 118 are changed to digital and shifted into the microprocessor 98 which compares the present locations of the imaged edges to the previous locations which are held in memory 100. The microprocessor 98 then calculates the present position and velocity which are output as feedback signals on lines 92 and 94, respectively to the servo controller 58 to correct any detected errors.

Considering the foregoing operation in more detail, the LED 78 illuminates a portion of the encoder wheel 50 and this portion including at least one edge is then imaged via lens 80 onto the sensor 70. Timing generator 102 produces all the required CCD clock signals on line 108 to shift out the pixel data via line 118. The timing generator 102 also outputs pixel addresses on line 110 and a once per line rate clock signal on lines 104 and 106. The pixel data is compared against threshold level 120 with comparator 116, the output of which is then applied directly to one shot 122 and inverted by gate 124 to one shot 126. The outputs of one shots 122 and 126 are 'OR'ed together by gate 128 to create an interrupting signal on line 106 for the micro controller 98 and a latching signal on line 132 for latch 112. As the pixel data increases or decreases past the threshold level, one shot 122 or 126 will generate a pulse which latches the present pixel address into the latch while causing the micro controller 98 to be interrupted. The micro controller interrupt service routine will then read the latched present pixel address, indicating relative edge position and store this address in memory 100. After shifting all data from the CCD 78, the timing generator 102 sends a line rate clock to the signal via line 106 to the micro controller 98. The microcontroller 98 then compares the past edge locations with the present edge locations and computes distance and velocity which are output via lines 92 and 94 to the servo controller 58.

Figure 3:
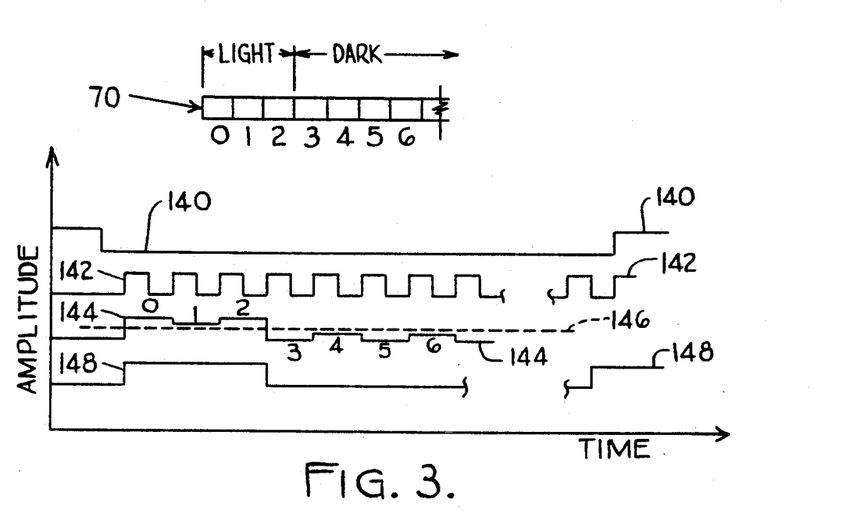
FIG. 3 is a graph including waveforms illustrating the system of FIG. 2.

The foregoing operation is illustrated further by the waveforms in FIG. 3. Assume that the rotational position of encoder wheel 50 relative to CCD sensor 70 is such that a transparent segment 60 is imaged onto pixels 0, 1 and 2 and that an opaque segment 62 is imaged on to pixels 3, 4, 5, 6, 7 etc., the total number of pixels in a typical sensor being 128. This is illustrated in the upper portion of FIG. 3. Waveform 140 is the once per line rate clock signal, and waveform 142 represents the CCD clock signals for shifting out the pixel data. Waveform 144 is the output of CCD sensor 70 which is applied to the one input 118 of comparator 116, and the threshold applied to the other comparator input 120 is indicated by line 146. The portions of waveform 144 provided by the individual pixels are indicated by the various pixel numbers. Waveform 148 is the output of comparator 116.

The operation of the system of FIG. 2 is illustrated further by the following example. Assume that sensor 70 contains 128 sensor elements or pixels. Table I presents a numerical example to illustrate the method employed by microprocessor 98 to calculate the position and velocity of the rotary shaft encoder element 50.

TABLE I

| Sample Time (seconds) | Old Edge (pixel) | New Edge (pixel) | Δ Pos (pixels) | Position (pixels) | Velocity (pixels/sec) |
| --- | --- | --- | --- | --- | --- |
| 0.000 | n/a | 5 | n/a | 0 | n/a |
| 0.001 | 5 | 13 | 8 | 8 | 8000 |
| 0.002 | 13 | 25 | 12 | 20 | 12000 |
| 0.003 | 25 | 39 | 14 | 34 | 14000 |
| 0.004 | 39 | 54 | 15 | 49 | 15000 |
| 0.005 | 54 | 71 | 17 | 66 | 17000 |
| 0.006 | 71 | 88 | 17 | 83 | 17000 |
| 0.007 | 88 | 104 | 16 | 99 | 16000 |
| 0.008 | 104 | 118 | 14 | 113 | 14000 |
| 0.009 | 118 | 3 | 14 | 126 | 13000 |
| 0.010 | 3 | 12 | 9 | 135 | 9000 |
| 0.011 | 12 | 18 | 6 | 141 | 6000 |
| 0.012 | 18 | 20 | 2 | 143 | 2000 |
| 0.013 | 20 | 16 | −4 | 139 | −4000 |
| 0.014 | 16 | 7 | −9 | 130 | −9000 |
| 0.015 | 7 | 119 | −16 | 114 | −16000 |
| 0.016 | 119 | 96 | −23 | 91 | −23000 |
| 0.017 | 96 | 64 | −32 | 59 | −32000 |
| 0.018 | 64 | 24 | −40 | 19 | −40000 |
| 0.019 | 24 | 102 | −50 | −31 | −50000 |
| 0.020 | 102 | | | | |

The first column is sample time comprising a series of 20 sampling intervals each 0.001 second in duration. The second column, labeled "Old Edge", is the previous edge or transition 64 location which is identified by pixel number. Similarly, the third column, labeled "New Edge", is the present edge or transition 64 location which is identified by pixel number. The fourth column, labeled ΔPos is the change in location of the edge or transition 64 from one sampling internal to the next and therefore is the position increment ΔPos. The quantity ΔPos is the is the difference between the new and old edge locations. The fifth column is the position output quantity provided by microprocessor 98. It is the sum of ΔPos over time, i.e. as the sample time increases by the 0.001 second increments. The fifth column is the velocity output quantity provided by microprocessor 98. It is obtained by dividing ΔPos by the sampling interval, in this case 0.001 second.

Considering the illustrative data of Table I in further detail, the first row indicates that the initial location of the imaged edge 64 is on pixel 5. The second row includes data resulting after the first 0.001 second sampling interval. Rotation of encoder element 50 during that interval moves edge 64 to a location imaged on pixel number 13 as indicated in column 3. The previous edge location, i.e. pixel number 5 is stored in memory 100 as indicated in column 2. TheΔPos quantity, i.e. 8 in column 3, is obtained by subtracting the previous edge location from the present or new edge location, i.e. 13−5=8. The position quantity in column 5 is obtained by adding the present ΔPos value to the previous position value, i.e. 8+0=8. The velocity value in the last column is obtained by dividing ΔPos by the sampling interval, i.e. 8/0.001=8000. The units of pixels/second can be converted to metric units simply by multiplying by the distance between two adjacent pixels in sensor 70.

By proceeding through a similar analysis, the data in the remaining rows of Table I can be explained in a similar manner. During the first eight sampling intervals, the edge 64 is imaged at various locations along the length of sensor 70 as indicated by the edge locations in column 3 from pixel number 5 to pixel number 118. During the next four sampling intervals the next edge 64 is imaged along the portion of sensor 70 from pixel number 3 to pixel number 20 as indicated in column 3. During the remaining sampling intervals shown in Table I, encoder 50 reverses in direction of rotation as indicated by the edge location given by the pixel numbers in column 3. As shown in the last column of Table I, during the first six sampling intervals, the velocity of encoder element 50 is increasing, during the next six sampling intervals the velocity is decreasing, whereupon during the thirteenth sampling interval the encoder element 50 changes direction of rotation so that the velocity is in the opposite direction.

Figure 4:
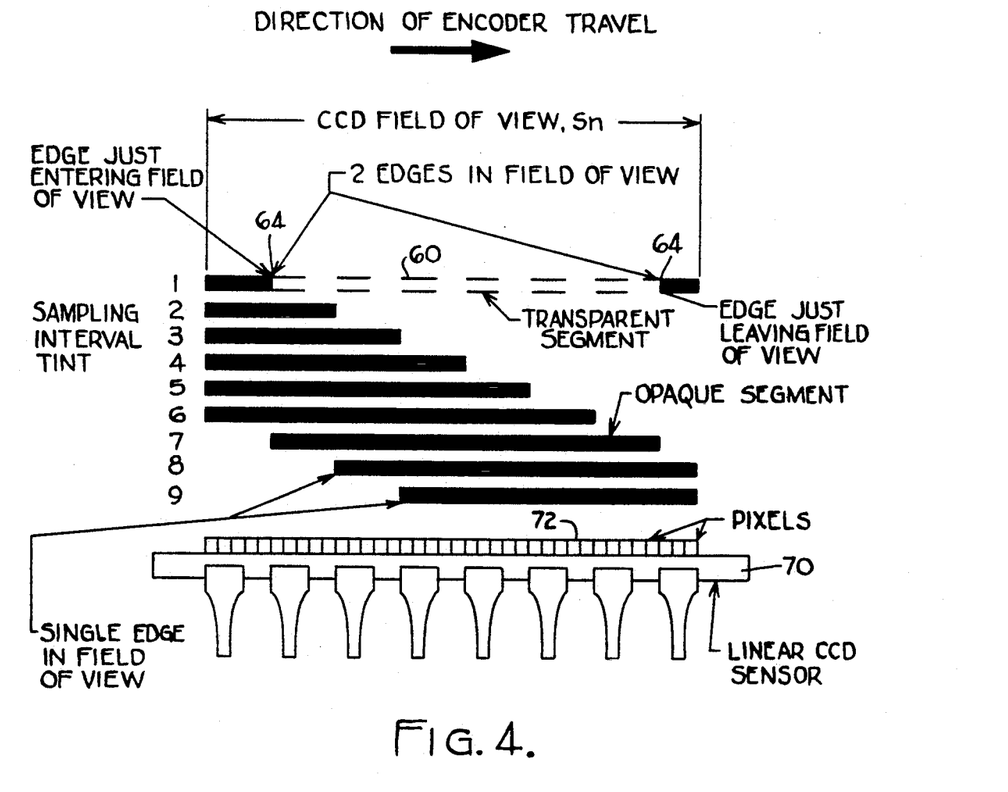
FIG. 4 is a schematic diagram illustrating operation of an aspect of the encoder system and method of FIG. 2.

There are certain requirements associated with the encoder system and method of the present invention. The imaged segment length, i.e., distance between edges 64, cannot be larger than the usable number of pixels 72 in the sensor array 79. A minimum of one segment, i.e. two edges 64, is required to be imaged on the pixels at some time during the operational cycle to derive a pixel spacing count for use by the microprocessor 98. Referring to FIG. 4, it may be seen that a minimum of one imaged edge is required to pass along the sensor pixels between the interval when two edges are again imaged on the sensor. This requirement may be expressed mathematically as:

$$N_c > \frac{\pi \, r \, Mag}{S_n S_p}$$

where:
- Nc = Minimum number of encoder wheel cycles
- r = Radius of encoder wheel
- Mag = Optical magnification of lens system
- Sn = number of active sensor pixels
- Sp = Sensor pixel pitch The encoder wheel radius r is measured from the axis 52 of wheel 50 to the optical axis 82. The above relationship for Nc can be used to calculate the minimum number of cycles, and hence minimum number of segments, around the periphery of encoder wheel 50 as will be described presently.

The resolution is a function of sensor pitch, magnification and radius of the encoder wheel according to the following relationship:

$$Res = \frac{2\pi \, rMag}{S_p}$$

where:
- Res = Resolution of encoder (states/revolution)
- r = Radius of encoder wheel
- Mag = Optical magnification of lens system
- Sp = Sensor pixel pitch The foregoing relationship clearly demonstrates an important characterizing feature and advantage of the encoder system and method of the present invention which is that the encoder resolution no longer is dependent on a high resolution encoder wheel or element.

Figure 5:
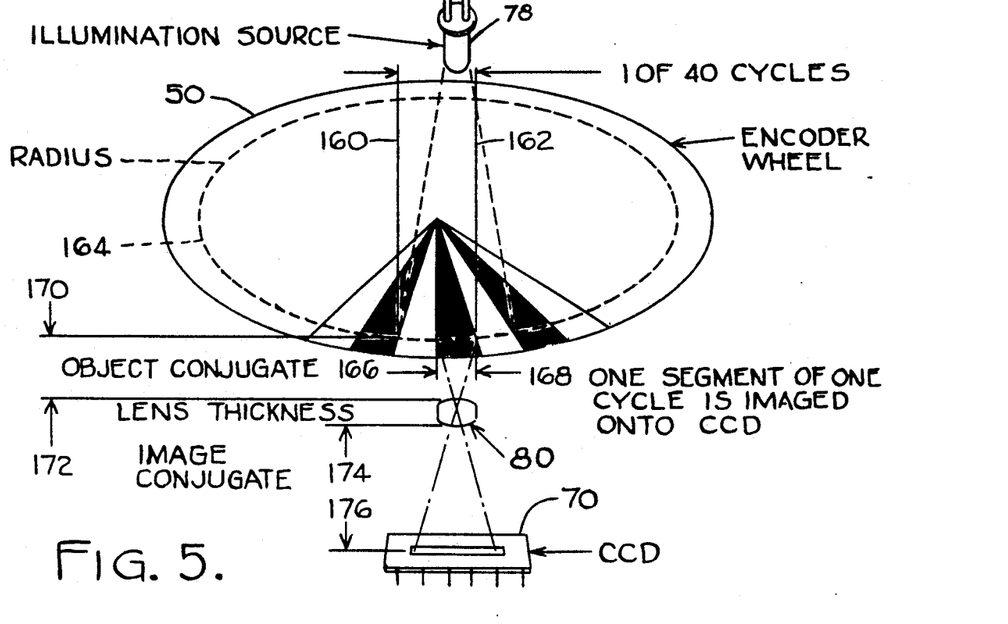
FIG. 5 is a schematic diagram illustrating operation of another aspect of the encoder system and method of FIG. 2.

In the encoder system and method of the present invention, the maximum rotational speed is a function of sensor 70 integration time (Tint), microprocessor 98 computation time (Tcomp) and the encoder wheel 50 resolution (Nc) according to the relationship:

$$w < \frac{1}{2 N_c (T_{int} + T_{comp})}$$

where:
- w = Maximum rotational speed (rev/sec)
- Nc = Number of encoder wheel cycles
- Tint = Sensor integration time
- Tcomp = Microprocessor computational time The method and apparatus of the present invention is further illustrated by FIG. 5 which presents an amplification of the portion of the system of FIG. 2 including encoder wheel 50, array 70 in the form of a CCD sensor, light source 78 and lens 80. A single cycle, which includes one transparent segment 60 and one adjacent opaque segment 62, is shown between lines 160 and 162. The minimum number of cycles Nc will be calculated in an example to follow. The radius of encoder wheel 50 is designated 164 in FIG. 5 and, as previously defined, is measured between the rotational axis 52 and the optical axis 82. In the illustrative arrangement shown, lens 80 is located relative to encoder wheel 50 and array 70 so as to image one segment 62 of one cycle onto array. This is indicated by lines 166,168. The object distance or object conjugate is measured between lines 170 and 172, the lens thickness is measured between lines 172 and 174, and the image distance or image conjugate is measured between lines 174 and 176.

The following example illustrates determination of the conjugate distances and system length in the optical system illustrated in FIG. 5. The following example assumes that the object is located in front of lens 80 and that lens positions are determined from the front and rear crowns. By way of example, in an illustrative system, lens 80 has a magnification of 2.0. Assuming further that the image size is 2.05 mm the image size will be 4.10 mm. The object distance or object conjugate is determined according to the formula:

$$OD = f(1/m + 1) + (FF - f)$$

where f is the lens focal length, m is the lens magnification and FF is the lens front focus. By way of example, in an illustrative system, lens 80 has a focal length f of 21.96 mm and a front focus FF of 22.2 mm. Substituting these quantities in the above formula gives an object distance of 33.18 mm as follows:

$$OD = 21.96 \, (\tfrac{1}{2} + 1) + (22.2 - 21.96)$$

$$OD = 32.94 + 0.24 = 33.18 \text{ mm}$$

The image distance or image conjugate is determined according to the formula:

$$ID = f(m+1) + (BF = f)$$

where f is the lens focal length, m is the lens magnification, and BF is the lens back focus. By way of example, in the foregoing illustrative system, the lens 80 has a focal length of 21.96 mm and a back focus, BF, of 16.5 mm. Substituting these quantities in the above formula gives an image distance of 59.42 mm as follows:

$$ID = 21.96(2+1) + (15.5 - 21.96)$$

$$ID = 65.88 + (-6.46) = 59.42 \text{ mm}$$

The system length includes the front and rear conjugates plus the lens length and therefore in the foregoing example is 99.33 mm.

The method and apparatus of the present invention is further illustrated by the following example wherein the minimum number of encoder wheel cycles, the encoder system resolution and the encoder wheel maximum speed are calculated according to the relationship previously given in connection with the description of FIG. 2. As previously described, the minimum number of encoder wheel cycles, Nc, is given by the relationship:

$$N_c > \frac{\pi \, r \, Mag}{S_n \, S_p}$$

where r is the encoder wheel radius, Mag is the lens magnification, Sn is the number of active sensor pixels and Sp is the sensor pixel pitch. The magnification of lens 80 was assumed to be 2.0 in the foregoing example and it is assumed further that the radius of encoder wheel 50 is 1 inch in an illustrative system. Also, by way of example, in an illustrative system, the CCD sensor is a Toshiba linear CCD model TCD104D wherein Sn is 128 and Sp is 32 μm. Substituting these quantities in the above formula gives a minimum number of encoder wheel cycles of 39 as follows:

$$N_c > \frac{(\pi)(2.54)(10^{-2})(2)}{(128)(32)(10^{-6})}$$

-continued $$Nc > 38.9$$

For convenience the round number of 40 can be used as the minimum number of encoder wheel cycles.

As previously described, the encoder resolution Res is given by the relationship:

$$Res = \frac{2\pi \, r \, Mag}{Sp}$$

where r is the encoder wheel radius, Mag is the lens magnification and Sp is the sensor pixel pitch. Substituting the above quantities in this formula gives an encoder resolution of 9975 pixels per revolution as follows:

$$Res = \frac{(2\pi)(2.54)(10^{-2}(2)}{32 \, um}$$

$$Res = 9975 \text{ pixels/rev}$$

This relatively high encoder resolution advantageously is independent of the resolution of encoder wheel 50. Accordingly, a low cost, coarse pitch encoder wheel 50 can be employed in the method and apparatus of the present invention.

As previously described, the maximum speed w of encoder wheel 50, and hence of the system of which it is a part, is given by the relationship:

$$w < \frac{1}{2Nc(Tint + Tcomp)}$$

where Nc is the number of encoder wheel cycles, Tint is the sensor integration time and Tcomp is the microprocessor computational time. As previously mentioned, 40 is used for number of cycles, Nc. In the above-identified illustrative sensor 70, Tint is 900 μsec. By way of example, in an illustrative system, microprocessor 98 is an Intel 8051 having Tcomp of 100 μsec. Substituting these quantities in the above formula gives a maximum speed of 750 r.p.m. as follows:

$$w < \frac{1}{(2)(40)(1 \, m \, sec)}$$

$$w < 12.5 \text{ rev/sec } 750 \text{ r.p.m.}$$

Figure 6:
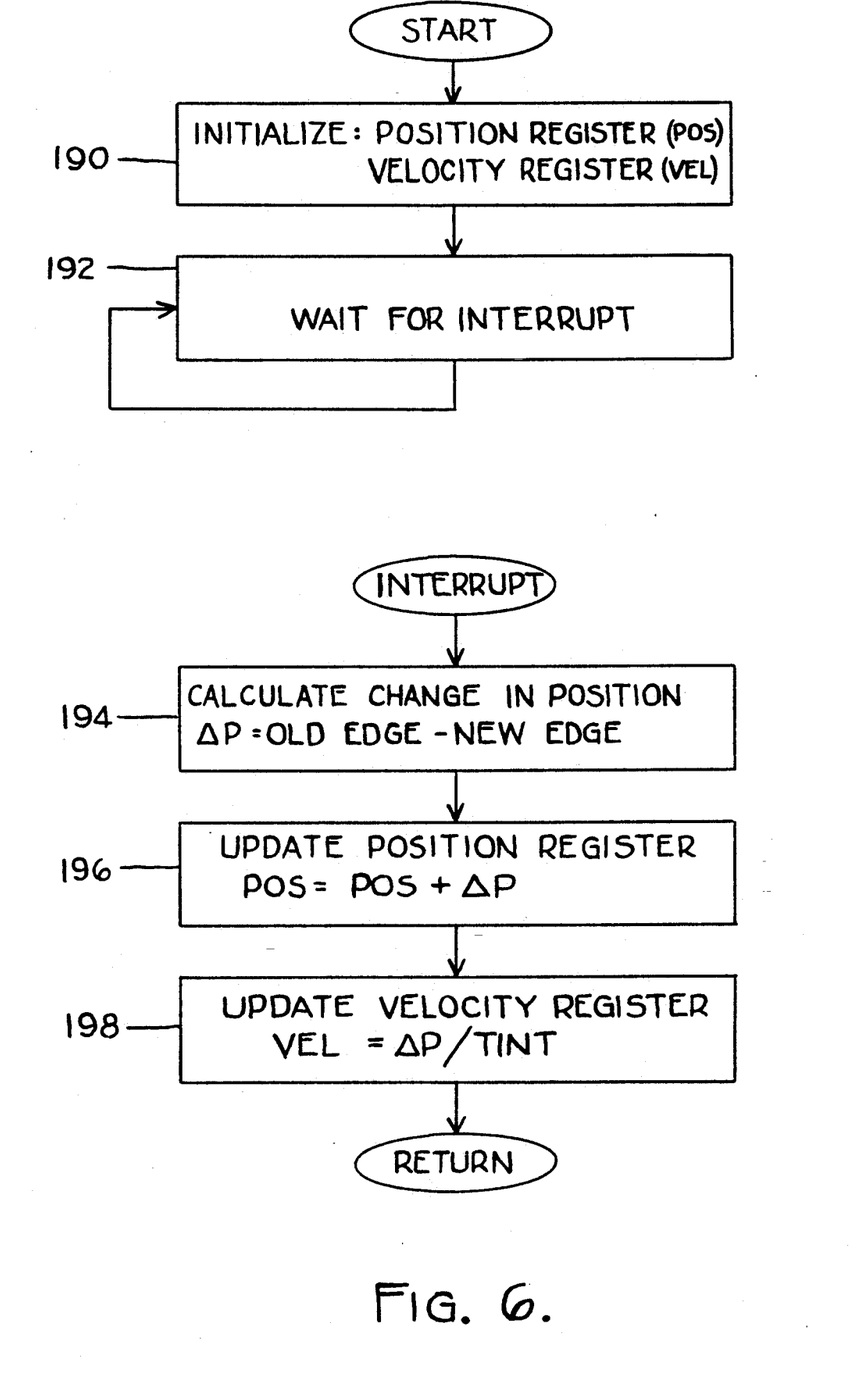
FIG. 6 is a program flow chart illustrating operation of another aspect of the encoder system and method of FIG. 2.

FIG. 6 is a program flowchart illustrating operation of microprocessor 98 in the system of FIG. 2 for carrying out the method of the present invention. At the start of the program there is an initializing routine 190 wherein a position register (POS) and a velocity register (VEL) in microprocessor 98 are initialized. Next, the program proceeds to a routine 192 where it awaits an interrupt. When an interrupt occurs in response to a signal on line 130, the program enters a routine 194 for calculating the change in edge position, i.e. ΔP=new edge—old edge. This produces results like those set forth in the fifth column of Table I. Finally, the program enters a routine 198 for updating the velocity register, i.e. VEL=ΔP/Tint. This produces results like those set forth in the last column of Table I. In this connection, as will be apparent from an inspection of Table I, the sensor integration time Tint and the sampling interval are equal. Upon completion of the operation in routine 198 the program returns and awaits the next interrupt signal on line 130.

By way of example, in an illustrative system, motor 56 is of the type commercially available from PMI Motor Technologies under the Designation 9FHP, LED 78 is a Hewlett Packard HLMP4101, lens 80 is the type having the characteristics described in the foregoing example, array 70 is a Toshiba TCD104D CCD sensor as previously described, comparator 16 is a National Semiconductor LM 339, inverter 124 is Texas Instruments SN 7404, one shots 122,126 are Texas Instruments SN74123, OR gate 128 is Texas Instruments SN 7432, timing generator 102 is an Advanced Micro Devices type PAL and latch 112 is Texas Instruments SN 74374.

If desired, a lens may be placed between the encoder wheel 50 and LED 78 to further increase light energy incident on the wheel segment edges. A tungsten or fluorescent source may also be employed, with appropriate filtering to improve response of the sensor 79. The optical path may be bent via a mirror, beam splitter, or other optical device so that the light source 78 and array 70 or both need not be aligned along a straight line path as in FIG. 2 but could be located in offset relation to path 82 in FIG. 2. The encoder wheel may be made in any configuration that supplies the necessary cycles of light and dark with sufficient clarity and sharpness, such as thin-gauge sheet metal or etched glass. The motor 56 may be of any type suitable for servo control. Although in the preferred arrangement of FIG. 2 array 70 is located and oriented so that the array longitudinal axis 74 is disposed tangent to encoder wheel 50 at a specific encoder wheel radius, it is not necessary that sensor 70 be placed tangent to wheel 50.

The encoder system and method according to the present invention has a number of advantages. A principal advantage is high resolution at low cost. High resolution is derived from the inexpensive linear CCD sensor 70 by virtue of its construction. A high cost, i.e. high resolution, encoder wheel 50 is not needed. Another advantage is loose tolerances. Because the interstices between edges 64 are handled as unique values by the microprocessor software, the encoder system can withstand fairly large manufacturing and alignment tolerances.

The encoder system and method of the present invention advantageously operates with substantially no torque losses. "Off the shelf" encoders typically are housed in their own cases and therefore additional torque is required to overcome bearing and coupling losses, resulting in an "oversized" system. The encoder of the present invention does not tax the torque requirements beyond the additional extremely low inertia of the encoder wheel 50. Another advantage is flexibility. The encoder can be closely matched to system requirements by changing to a sensor 70 with a smaller pixel pitch, modifying the radius at which the sensor is located, or altering the magnification of the optical system. Manipulating the information received from the sensor 70 in the microprocessor software can result in a programmable or variable encoder. "Off the shelf" encoders typically offer a fixed number of output pulses. Custom encoders can match the application better than those purchased "off the shelf", but require a substantial tooling investment to manufacture high resolution wheels.

In addition to the foregoing, the encoder system of the present invention as illustrated in FIG. 2 advantageously provides both position and velocity signals from the single arrangement of encoder wheel 50, optical system, sensor array 70 and processing means 90 in contrast to the prior art system of FIG. 1 requiring the separate tachometer 20 and position encoder 32.

Figure 7:
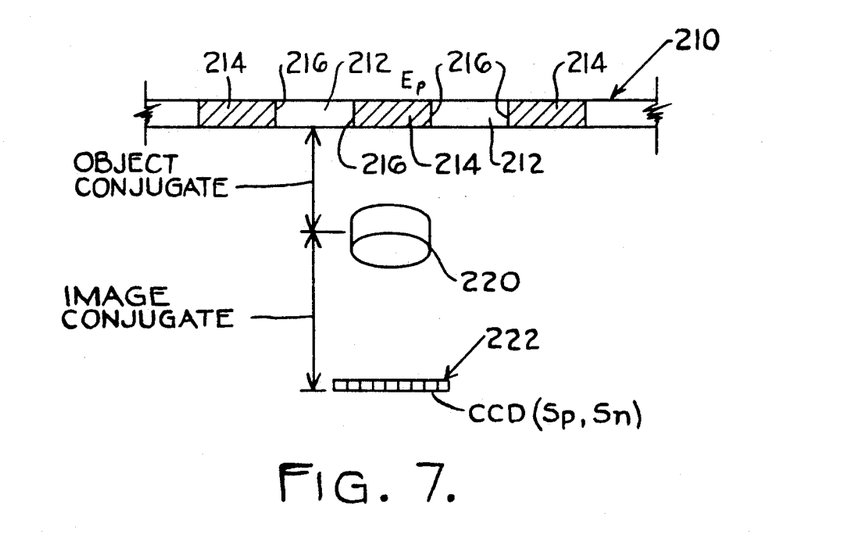
FIG. 7 is a schematic diagram illustrating another form of the encoder system and method according to the present invention.

FIG. 7 illustrates the manner in which the encoder system and method of the present invention can be employed with an encoder element 210 which is adapted for linear movement, preferably bidirectional, by suitable motive means (not shown). Encoder element 210 has a series of segments arranged along a substantially linear path, adjacent segments having different characteristics and meeting in a transition. As shown in FIG. 7, encoder element 210 includes alternating transparent and opaque segments 212 and 214, respectively, meeting in edges 216. As in the previous embodiment, two adjacent segments 212,214 comprise a cycle, and encoder element 210 has a number of cycles spaced equally along the linear path. There is provided a light source (not shown) located on one side of encoder element 210 and a lens 220 on the other for imaging segments and transitions onto a linear array of sensitive elements in the form of charge coupled device sensor 222 in a manner similar to that of the system of FIG. 2. The CCD sensor 222 would be connected to a processing means (not shown) like that designated 90 in FIG. 2 which, in turn, would apply position and velocity signals to a servo controller (not shown) for controlling the motive means which moves encoder element 210.

The encoder pitch, Ep, of element 210 is the number of cycles per unit length and is given by the relationship:

$$Ep < \frac{2\ SnSp}{Mag}$$

where Sn is the number of active sensor pixels, Sp is the sensor pixel pitch and Mag is the lens magnification.

The encoder resolution, Res, is the number of pixels per unit length and is given by the relationship:

$$Res = \frac{Sp}{Mag}$$

Advantageously, the encoder resolution Res is independent of the resolution of encoder element 210 as in the previous embodiment so that a low cost, relatively coarse resolution encoder element 210 can be used.

The maximum speed V of encoder element 210 is given by the relationship:

$$V < \frac{1}{2\ Ep\ (Tint + Tcomp)}$$

where Tint and Tcomp are the same quantities given in connection with the system of FIG. 2.

It is therefore apparent that the present invention accomplishes its intended objects. There is provided a new and improved encoder system and method which achieves high resolution at low cost. The high resolution, low cost encoder system and method of the present invention finds use in low speed applications, achieves close matching to system requirements in a convenient and economical manner and is efficient in operation and economical to manufacture.

While embodiments of the present invention have been described in detail, that is done for purposes of illustration, not limitation.

What is claimed is:

1. An encoder system comprising:
    a) an encoder element comprising a series of segments arranged sequentially along a path on said element, said segments having two different properties and adjacent segments being of different properties, the spacing between segments of like properties defining a relatively coarse pitch relationship;
    b) an array of sensor elements in closely-spaced fine pitch relation each having two states, said sensor elements being arranged sequentially along a path;
    c) means for providing a coupling medium between said encoder element and said array which is responsive to the properties of said encoder element segments and which causes a change in state of said sensor elements in response to movement of said encoder element relative to said array;
    d) said encoder element and said array being oriented relative to each other so that said path of said encoder element segments and said path of said array sensor elements are in operative relationship such that upon movement of said encoder element relative to said array said encoder element segments cause a change in state of said array sensor elements along said path of said array sensor elements;
    e) said encoder element adapted for movement relative to said array so that the number of sensor elements changed in state during a given time is a function of the speed and position of said encoder element; and
    f) processing means connected to said array for converting information on the state of said sensor elements including the number of sensor elements changed in state into first and second output signals containing information on the position and velocity, respectively, of said encoder element.

2. The encoder system of claim 1, further including means connected to said processing means for utilizing said first and second output signals.

3. The encoder system according to claim 1, wherein said encoder element is drivenly connected to the output shaft of a motor having a servo controller connected in controlling relation thereto, said path of said encoder segments extending circumferentially around said motor output shaft, said encoder element being rotated by said motor so that the number of sensor elements changed in state during a given time is a function of the velocity and position of said motor output shaft, and wherein said first and second output signals provided by said processing means are applied to said servo controller for controlling the speed of said motor.

4. The encoder system according to claim 1, wherein said encoder segments comprise a series of alternating transparent and opaque regions arranged in a series along said path, adjacent regions meeting in an edge, wherein said array comprises a charge coupled device including a plurality of photoelectric sensor elements, and wherein said means for providing a coupling medium comprises optical means for imaging edges on said encoder element onto said charge coupled device, said encoder element adapted for movement relative to said charge coupled device so that the particular edge imaged onto said charge coupled device in a given time is a function of the speed and position of said encoder element.

5. The encoder system according to claim 1, wherein said encoder element is adapted for linear movement and wherein said encoder element segments are arranged along a substantially linear path.

6. An encoder system comprising:
a) an encoder element comprising a series of alternating transparent and opaque segments arranged sequentially along a path on said element wherein adjacent ones of said segments meet in a transition, the spacing between segments of like optical properties defining a relatively coarse pitch relationship;
b) a charge-coupled device comprising an array of photoelectric sensor elements in closely spaced, fine pitch relation arranged sequentially along a path, said device providing signals containing information on the state of said sensor elements at a given time;
c) optical means for optically coupling said encoder element and said charge-coupled device so that transitions on said encoder element are imaged onto said charge coupled device;
d) said encoder element and said charge coupled device being oriented relative to each other so that said path of said encoder element segments and said path of said array sensor elements are in operative relationship such that upon movement of said encoder element relative to said charge coupled device said encoder element transitions are imaged onto said charge coupled device along said path of said array sensor elements;
e) said encoder element adapted for movement relative to said charge coupled device so that the location of imaged transitions on said charge-coupled device is a function of the speed and position of said encoder element; and
f) processing means connected to said charge-coupled device for converting information on the state of said sensor elements including the location of imaged transitions thereon into first and second output signals containing information on the position and velocity, respectively, of said encoder element.

7. The encoder system according to claim 6, further including means connected to said processing means for utilizing said first and second output signals.

8. The encoder system according to claim 6, wherein said encoder element is drivenly connected to the output shaft of a motor having a servo controller connected in controlling relation thereto, said path of said encoder segments extending circumferentially around said motor output shaft, said encoder element being rotated by said motor so that the location of transitions imaged onto said charge coupled device at a given time is a function of the velocity and position of said motor output shaft, and wherein said first and second output signals provided by said processing means are applied to said servo controller for controlling the speed of said motor.

9. The encoder system according to claim 6, wherein said encoder element is adapted for linear movement in a given direction and wherein said encoder element segments are arranged along a substantially linear path.

10. An encoder system comprising:
a) an encoder element adapted for rotation about an axis, and having a series of segments arranged along a substantially circular path substantially concentric with said axis, adjacent segments being of different optical characteristics and meeting in a transition, two adjacent segments comprising a cycle and said element having a number of cycles (Nc) equally spaced around said path;
b) an array of photosensitive elements having a longitudinal axis, said elements being spaced at a specific sensor pitch (Sp) along said axis;
c) optical means for directing light along a path through said segments and onto said array for imaging segments at a predetermined magnification (Mag) onto a number (Sn) of said photosensitive elements;
d) the minimum number of encoder element cycles being defined by the relationship:

$$Nc > \frac{\pi \, r \, Mag}{Sn Sp}$$

where r is the radius of the encoder element measured from the axis thereof to a point on said path where light is incident on said segments; and
e) the resolution (Res) of said encoder system being defined by the relationship:

$$Res = \frac{2\pi \, r \, Mag}{Sp}$$

11. An encoder system according to claim 10, further including processing means operatively connected to said array for converting signals from said array containing data relating to said photosensitive elements into output signals containing information on the speed and position of said encoder element, the maximum rotational speed (w) of said encoder element being determined according to the relationship:

$$w < \frac{1}{2Nc(Tint + Tcomp)}$$

where Tint is the integration time of said array and Tcomp is the computational time of said processing means.

12. An encoder system according to claim 11, further including means operatively connected to said processing means for utilizing said output signals.

13. An encoder system comprising:
a) an encoder element adapted for linear movement and having a series of segments arranged along a substantially linear path, adjacent segments having different optical characteristics and meeting in a transition, two adjacent segments comprising a cycle, and said element having a number of cycles equally spaced along said path and the number of said cycles in a unit length being the encoder element pitch (Ep);
b) an array of photosensitive elements having a longitudinal axis, said elements being spaced at a specific pitch (Sp) along said axis;
c) optical means for directing light along a path through said segments and onto said array for imaging segments at a predetermined magnification (Mag) onto a number (Sn) of said photosensitive elements;
d) the encoder element pitch being defined by the relationship:

$$Ep < \frac{2 \, Sn Sp}{Mag};$$

and e) the resolution (Res) of said encoder system being defined by the relationship:

$$Res = \frac{Sp}{Mag}$$

14. An encoder system according to claim 13, further including processing means operatively connected to said array for converting signals from said array containing data relating to said photosensitive elements into output signals containing information on the speed and position of said encoder element, the maximum speed (v) of said encoder element being determined according to the relationship:

$$V < \frac{1}{2\,Ep\,(Tint + Tcomp)}$$

where Tint is the integration time of said array and Tcomp is the computational time of said processing means.

15. An encoder system according to claim 14, further including means operatively connected to said processing means for utilizing said output signals.

16. An encoder method for position and velocity control comprising the steps of:
 a) providing an encoder in operative relationship to the output of a system to be controlled, said encoder having a series of segments arranged sequentially along a path with adjacent segments having different properties and meeting in a transition, there being a plurality of transitions spaced along said path in a relatively coarse pitch relation;
 b) providing an array of sensor elements sequentially along a path in closely spaced fine pitch relation each having two states;
 c) providing a coupling medium between said encoder and said array which is responsive to the properties of said encoder and which causes a change in the state of said sensor elements in response to movement of said encoder;
 d) orienting said encoder and said array of sensor elements relative to each other so that said path of said encoder segments and said path of said array sensor elements are in operative relationship such that upon movement of said encoder relative to said array said encoder segments cause a change in state of said array sensor elements along said path of said array sensor elements;
 e) moving said encoder relative to said array so that said array provides signals containing information as to the location of said transitions; and
 f) utilizing said array signals to provide position and velocity signals for controlling said system.

17. An encoder system comprising:
 a) an encoder element comprising a series of segments arranged along a path on said element, said segments having two different properties and adjacent segments being of different properties, the spacing between segments of like properties defining a relatively coarse pitch relationship;
 b) an array of sensor elements in closely-spaced fine pitch relation each having two states;
 c) means for providing a coupling medium between said encoder element and said array which is responsive to the properties of said encoder element segments and which causes a change in state of said sensor elements in response to movement of said encoder element relative to said array;
 c) said encoder element adapted for movement relative to said array so that the number of sensor elements changed in state during a given time is a function of the speed and position of said encoder element; and
 e) processing means connected to said array for converting information on the state of said sensor elements including the number of sensor elements changed in state into first and second output signals containing information on the position and velocity, respectively, of said encoder element, said processing means comprising processor means including storage means and calculating means and conversion and timing means for establishing a sampling interval and for converting signals from said array during said sampling interval into signals containing information on the present relationship between said encoder element and said array for storage in said storage means and for operation by said calculating means so that said calculating means compares the present encoder element-array relationship to the previous encoder element-array relationship stored in said storage means and calculates the present position and velocity of said encoder element to provide said first and second output signals.

18. An encoder system comprising:
 a) an encoder element comprising a series of alternating transparent and opaque segments arranged along a path on said element wherein adjacent ones of said segments meet in a transition, the spacing between segments of like optical properties defining a relatively coarse pitch relationship;
 b) a charge-coupled device comprising an array of photoelectric sensor elements in closely spaced, fine pitch relation, said device providing signals containing information on the state of said sensor elements at a given time;
 c) optical means for optically coupling said encoder element and said charge-coupled device so that transitions on said encoder element are imaged onto said charge coupled device;
 d) said encoder element adapted for movement relative to said charge coupled device so that the location of imaged transitions on said charge-coupled device is a function of the speed and position of said encoder element; and
 e) processing means connected to said charge-coupled device for converting information on the state of said sensor elements including the location of imaged transitions thereon into first and second output signals containing information on the position and velocity, respectively, of said encoder elements, said processing means comprising processor means including storage means and calculating means and conversion and timing means for establishing a sampling interval and for converting signals from said charge-coupled device during said sampling interval into signals containing information on the present location of transitions imaged on said charge coupled device for storage in said storage means and for operation by said calculating means, so that said calculating means compares the present transition location to the previous transition location stored in said storage means and calculates the present position and velocity of the encoder element to provide said output signal.

19. An encoder method for position and velocity control comprising the steps of:
   a) providing an encoder in operative relationship to the output of a system to be controlled, said encoder having a series of segments arranged along a path with adjacent segments having different properties and meeting in a transition, there being a plurality of transitions spaced along said path in a relatively coarse pitch relation;
   b) providing an array of sensor elements in closely spaced fine pitch relation each having two states;
   c) providing a coupling medium between said encoder and said array which is responsive to the properties of said encoder and which causes a change in the state of said sensor elements in response to movement of said encoder;
   d) moving said encoder relative to said array so that said array provides signals containing information as to the location of said transitions; and
   e) utilizing said array signals to provide position and velocity signals for controlling said system comprising providing a sampling interval, determining the present transition location during each sampling interval, storing the present transition location, comparing the present transition location to the previously stored transition location to obtain a difference quantity, adding the difference quantity to the previous stored transition location to obtain a position information quantity to provide the position signal, and dividing the difference quantity by the sampling interval to obtain a velocity information quantity to provide the velocity signal.

* * * * *